US010365296B2

(12) United States Patent
Askarpour

(10) Patent No.: US 10,365,296 B2
(45) Date of Patent: Jul. 30, 2019

(54) SYSTEMS AND METHODS FOR COMPENSATING FOR THE ABSENCE OF A SENSOR MEASUREMENT IN A HEADING REFERENCE SYSTEM

(71) Applicant: Innovative Solutions & Support, Inc., Exton, PA (US)

(72) Inventor: Shahram Askarpour, Media, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 158 days.

(21) Appl. No.: 15/281,015

(22) Filed: Sep. 29, 2016

(65) Prior Publication Data

US 2018/0088147 A1  Mar. 29, 2018

(51) Int. Cl.
*G01P 21/00* (2006.01)
*G01P 5/10* (2006.01)
*G01P 5/14* (2006.01)
*G06F 17/18* (2006.01)
*G01C 19/00* (2013.01)
*G01C 23/00* (2006.01)
*G05D 1/08* (2006.01)

(52) U.S. Cl.
CPC .............. *G01P 21/00* (2013.01); *G01C 19/00* (2013.01); *G01C 23/00* (2013.01); *G01P 5/10* (2013.01); *G01P 5/14* (2013.01); *G05D 1/0808* (2013.01); *G06F 17/18* (2013.01)

(58) Field of Classification Search
CPC ....................................................... G01P 21/00
USPC ....................................................... 702/144
See application file for complete search history.

(56) References Cited

U.S. PATENT DOCUMENTS

| 4,143,467 | A  | 3/1979  | Erspamer et al. |
| 4,347,730 | A  | 9/1982  | Fisher et al.   |
| 4,870,602 | A  | 9/1989  | Baumker         |
| 6,408,251 | B1 | 6/2002  | Azuma           |
| 7,146,740 | B2 | 12/2006 | Manfred         |
| 7,587,277 | B1 | 9/2009  | Wells           |
| 8,108,171 | B2 | 1/2012  | Judd            |
| 8,209,140 | B2 | 6/2012  | Bailey          |

(Continued)

OTHER PUBLICATIONS

True Airspeed—Wikipedia [online], Jun. 28, 2016 [retrieved Feb. 14, 2018]. Retrieved from the Internet <URL: https://en.wikipedia.org/w/index.php?title=True_airspeed&oldid=727293357>.

(Continued)

*Primary Examiner* — Ricky Ngon
(74) *Attorney, Agent, or Firm* — Bryan Cave Leighton Paisner LLP

(57) ABSTRACT

Methods and systems for compensating for the absence or loss of a sensor measurement in a heading reference system such as an aircraft attitude and heading reference system, integrated standby unit, or vehicle inertial system, provides an estimate of the lost sensor measurement by estimating the bank angle after a detected vehicle turn. The estimate of the bank angle may also be used to estimate the vehicle's speed. Additionally, when the lost sensor measurement is a temperature measurement, the described methods and systems offer an improvement over estimating air temperature using a standard (e.g., ISA) model. The methods and systems also allow for the refinement of computed estimates using filtering techniques, such as low-pass or Kalman filtering. The methods may be iteratively repeated for each detected turn in order to maintain an accurate estimate of the lost sensor measurement or other estimates, such as vehicle speed.

20 Claims, 13 Drawing Sheets

(56) References Cited

U.S. PATENT DOCUMENTS 9,207,079 B2    12/2015   Askarpour
2006/0217852 A1   9/2006   Price
2016/0054126 A1   2/2016   Askarpour

OTHER PUBLICATIONS

Standard rate turn—Wikipedia [online], Aug. 23, 2016 [retrieved May 24, 2018]. Retrieved from the Internet <URL: https://en.wikipedia.org/w/index.php?title=Standard_rate_turn&oldid=735850211>.

SYSTEMS AND METHODS FOR COMPENSATING FOR THE ABSENCE OF A SENSOR MEASUREMENT IN A HEADING REFERENCE SYSTEM

FIELD OF THE INVENTION

The present invention relates to systems and methods for compensating for the absence or loss of a sensor measurement used in vehicle heading reference systems, such as attitude and heading reference systems on aircraft or heading systems on ships. Specifically, systems and methods are disclosed for adjusting the measurements provided by attitude and heading reference systems by compensating for the absence of measurements (e.g., temperature, pressure) provided by one or more sensors that may fail.

BACKGROUND OF THE INVENTION

Vehicles of today may include one or more attitude and heading reference systems (AHRS). An AHRS system is commonly viewed as a tri-axial sensor system that is capable of providing real-time orientation and direction information. As a result, such a system is required to be reliable, efficient and accurate. In order to calculate navigation related parameters, an AHRS system typically includes gyroscopes, accelerometers and magnetometers that are capable of sensing and measuring rotation, proper acceleration and magnetic field magnitude, respectively.

Typically, vehicles having an attitude and heading reference system, such as an aircraft having an AHRS, must be periodically calibrated to minimize measurement errors attributed to hardware and/or environmental factors. In order to achieve such calibration, alternative techniques may be employed to obtain redundant measurements that can be used for comparative purposes. Typically, these redundant measurements rely on the use of vehicle probes (e.g., sensors) capable of measuring variables such as static air temperature, static air pressure, variable/dynamic air pressure and others. However, in many instances, the required vehicle probes may malfunction, become inoperative, be inaccessible, or be absent thus hindering the collection of the desired measurements. For example, a MEMS-based AHRS may rely on measurements produced by one or more MEMS-based gyroscopes to provide attitude and heading measurements. These MEMS-based gyroscopes tend to suffer from a long term random walk (i.e., bias). Accordingly, a second and independent source of measurement may be employed to provide or augment attitude and heading measurements. In turn, these independent attitude and heading measurements are used to correct the gyro bias on a periodic basis.

Sources of these independent attitude and heading measurements include accelerometers and magnetometers. Accelerometers and other such sensors, however, are susceptible to forces other than gravity (e.g., centripetal forces induced by vehicle turns), which tend to introduce additional errors. To further compensate for such outside forces, a dynamic model is used. For example, in flight systems, the dynamic model assumes a coordinated turn and employs the equation:

$$\theta = \tan^{-1}\left(\frac{TAS \cdot TR \cdot K}{g}\right),$$

where: $\theta$ is Bank Angle, TAS is True Airspeed, TR is Turn Rate, K is a scaling factor and g is Gravity. In turn, the models of the affected sensor systems are augmented by the bank angle calculation from the dynamic model. For example, the sensor (e.g., accelerometer, magnetometer) measurement model may be augmented by the bank angle $\theta$ computed from the dynamic model.

As can be seen from the dynamic model equation $$\theta = \tan^{-1}\left(\frac{TAS \cdot TR \cdot K}{g}\right),$$

a measurement of true airspeed (TAS) is required to compute vehicle bank angle $\theta$. True airspeed (TAS) itself is a function of dynamic pressure, static pressure, and static air temperature and can be expressed according to the following relationship:

$$TAS = 661.47\sqrt{\frac{5T}{288.15}\left[\left(\frac{q_c}{P}+1\right)^{\frac{2}{7}}-1\right]},$$

where: T is static air temperature, $q_c$ is dynamic pressure, and P is static pressure.

Typically, an AHRS would rely on true airspeed calculations from an air data computer. However, in an Air Data Attitude Heading Reference System (ADAHRS), the true airspeed is calculated internally by interfacing with the aircraft probes. In each case, probes measure the dynamic pressure, static pressure, and static air temperature. For example, most air data computers interface with the aircraft pilot probe for measurement of dynamic pressure, static probe for measurement of static pressure, and static air temperature probe for measurement of static air temperature.

In situations where there are no accessible outside temperature probes or the temperature probe has failed, default/standard models may be used to provide a temperature estimate. For example, an International Standard Atmosphere (ISA) temperature model of the earth can be used to estimate the outside static air temperature based on the current altitude, where a 20° C. temperature at sea level is assumed. Because this is a default model meant to provide an approximation, however, this estimated temperature may not be reflective of actual conditions, thereby leading to inaccuracies in the TAS calculation.

Because sensors (e.g., temperature, pressure, etc.) have been known to fail, become unavailable, or otherwise cease to provide measurements, there is a need to provide for an improved estimate of these measurements in the event of such failure or other absence. Similarly, there is also a need to provide an estimate of true airspeed in the event of similar or other sensor failures that are used to calculate true airspeed (TAS), such as pressure probes.

SUMMARY OF PARTICULAR EMBODIMENTS OF THE INVENTION

The present invention is directed to systems and methods for compensating for the absence of a sensor measurement in a vehicle with a heading reference system such as an AHRS.

In certain embodiments, the systems and methods use a processor configured to detect a temperature sensor measurement loss, where the temperature measurement is used to calculate the vehicle's true airspeed; detect a vehicle turn and in response calculate a first vehicle bank angle; estimate the vehicle's true air speed using the first vehicle bank angle; estimate a value for the lost temperature measurement using the vehicle's estimated true airspeed; estimate a second vehicle bank angle using the estimate of the lost temperature measurement; and augment a sensor measurement model to compensate for a gyro-bias drift rate using the estimated second bank angle.

In certain embodiments, the system comprises a memory and a temperature sensor, static pressure sensor, or dynamic pressure sensor coupled to the memory. In certain embodiments, the system comprises a processor coupled to the sensors.

In certain embodiments, the systems and methods compensate for the absence of sensor measurement, which is used to calculate the vehicle's speed; detect a vehicle turn and in response calculate an initial vehicle bank angle; estimate the vehicle's true air speed using the initial vehicle bank angle; estimate a value for the sensor measurement using the vehicle's estimated speed. In certain embodiments, the system and methods further estimate the vehicle bank angle using the vehicle's estimated speed or the estimate of the sensor measurement value; and augment a sensor measurement model to compensate for a gyro-bias drift rate using the estimated vehicle bank angle.

In certain embodiments, the sensor measurement may be a temperature, static pressure, or dynamic pressure measurement. In certain embodiments, the sensor measurement is a ratio of dynamic pressure to static pressure. In certain embodiments, the initial vehicle bank angle is calculated using a short timeframe integration of gyroscopic measurements that accounts for a bias-drift of the gyroscopic measurements.

In certain embodiments, the estimated values may be refined. In certain embodiments, estimated values are refined using a low-pass filter with a cut off frequency lower than a gyro-bias drift rate. In certain embodiments, estimated values are refined using a Kalman filter.

In certain embodiments, the system and methods use a processor configured to detect a temperature sensor measurement loss, where the temperature measurement is used to calculate the vehicle's true airspeed; detect a turn by the vehicle; detect a vehicle turn and in response calculate a first vehicle bank angle; estimate a first static air temperature using the first vehicle bank angle; estimate a second static air temperature independently of the first vehicle bank angle; compute an adjusted static air temperature using the first and second static air temperatures; and augment a sensor measurement model to compensate for a gyro-bias drift rate using the adjusted static air temperature.

In certain embodiments the systems and methods further calculate a temperature error estimate between the first and second static air temperatures and add the temperature error estimate to a subsequently computed static air temperature to compute the adjusted static air temperature. In certain embodiments, the second and subsequently computed static air temperatures are calculated using a standard model (e.g., an ISA model). In certain embodiments, the temperature error estimate is decayed based upon a passage of time or change in the vehicle's position. In certain embodiments, the temperature error estimate is refined using a low-pass filter with a cut off frequency lower than the gyro-bias drift rate. In certain embodiments, the temperature error estimate is refined using a Kalman filter.

In certain embodiments, the systems and methods further weight the first static air temperature using a first weight value; weight the second static air temperature using a second weight value; and add the weighted first and weighted second static air temperatures to compute the adjusted static air temperature. In certain embodiments, the first or second weight value is decayed based upon a passage of time or a change in the vehicle's position.

DETAILED DESCRIPTION OF EMBODIMENTS OF THE INVENTION

Systems and methods are provided for compensating for the loss of a sensor measurement in an attitude and heading reference system such as an aircraft attitude and heading reference system, integrated standby unit, or vehicle inertial system. The systems and methods described herein provide alternative and redundant techniques for determining critical sensor measurements, which are used by the vehicle's attitude and heading reference system. Generally, these sensor measurements are required to accurately discern, control and plot the vehicle's course. To compensate for the absence of a sensor measurement due to probe failure, lack of access or other loss, an initial estimate of vehicle bank angle is calculated following the detection of a turn. Using the initial estimate of vehicle bank angle, an estimate of the vehicle's true air speed is determined. Using the estimate of vehicle speed (e.g., true airspeed) an estimate of the lost sensor measurement may be further calculated. The provided systems and methods further allow for the refinement of estimates. For example, estimates may be refined by low-pass filtering or Kalman filtering. Further details of certain embodiments are discussed below in connection with the figures provided in the accompanying drawings.

Figure 1:
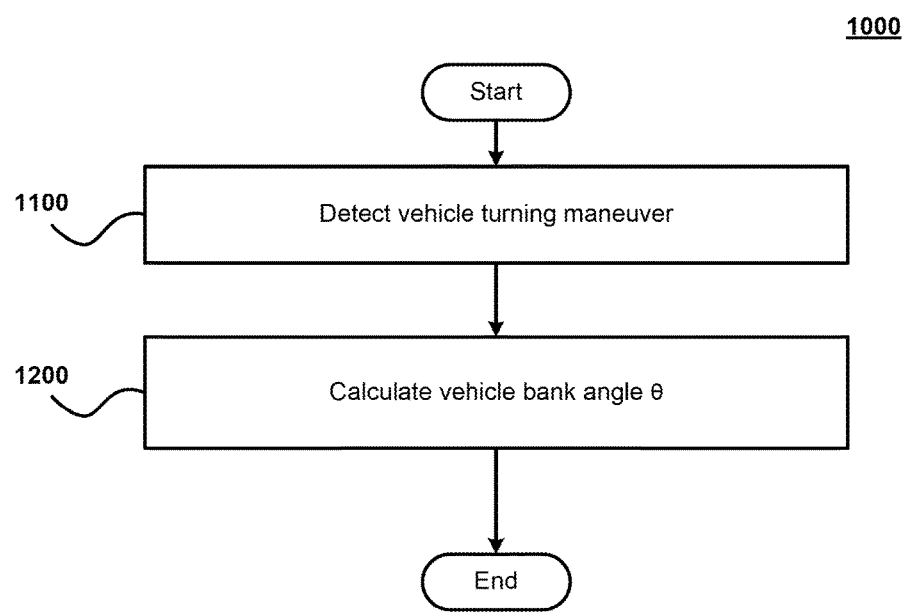
FIG. 1 is a flow diagram illustrating a process for obtaining an estimate of vehicle bank angle θ in accordance with some embodiments of the present invention.

FIG. 1 is a process flow diagram that illustrates a method 1000 for obtaining an estimate of vehicle bank angle θ using the measurements provided by certain sensors (e.g., gyroscopes, accelerometers, magnetometers). These sensors may be part of an AHRS, ADAHRS, and/or inertial measurement unit (IMU) installed on a vehicle, such as an aircraft. In step 1100, it may be determined that the vehicle is beginning a turning maneuver (e.g., a coordinated turn). Turn detection may be accomplished in any known manner. In certain embodiments, turn detection may be accomplished using a steering angle sensor, yoke angle sensor, and/or a similar mechanical position sensor. Turn detection may also be accomplished using the output of a motion or other sensor (e.g., gyroscope, accelerometer, inclinometer, and/or turn coordinator). For example, the output measurement of a gyroscope may be filtered (e.g., low-pass, high-pass, notch, or band-pass filtered) to detect a turn. In certain embodiments, a turn may be detected when the output of such a filter crosses and/or remains above a threshold indicative of a turn. The outputs of other motion sensors may also be used to detect a turn. Additionally, the output of multiple turn detection techniques may be used in the aggregate to detect a turn. A turn may also be detected by observing a change in vehicle magnetic heading utilizing a magnetometer.

In step 1200, an initial estimate of vehicle bank angle θ is calculated. In certain embodiments, vehicle bank angle θ is calculated for every turn detected in step 1100. In certain other embodiments, it is calculated for less than every turn detected in step 1100. In certain embodiments, the estimate of vehicle bank angle θ is updated during the turn. In certain embodiments, the estimate of vehicle bank angle θ is continuously or periodically computed. As discussed above, vehicle bank angle θ may be calculated using sensor measurements from sensors which may be part of an AHRS, ADAHRS or IMU. In certain embodiments, vehicle bank angle θ is calculated by integrating the measurements provided by one or more gyroscopes. For example, the measurements of three gyroscopes disposed in three separate axes may be used (e.g., a tri-axial gyroscope). Measurements from other sensors (e.g., accelerometers, magnetometers) may also be used to calculate vehicle bank angle θ. In addition, combinations of sensor types may also be used to calculate vehicle bank angle θ. For example, in certain embodiments, accelerometers and/or magnetometers may be used as part of an alignment to a reference coordinate system, so that the multi-axis gyroscopic measurements can be properly decomposed into the respective axes of the reference coordinate system.

In certain embodiments, vehicle bank angle θ is calculated by integrating the measurements from one or more gyroscopes over time. In certain embodiments, the gyroscopes are continuously or periodically integrated to compute vehicle bank angle θ (e.g., without detecting a turn and/or during a turn). In certain embodiments, the timeframe of the integration (e.g., the time between the first and last sample used in the integration) is short enough such that the gyro-bias drift over the integration timeframe is kept to an acceptable level. In certain embodiments, the timeframe of integration is determined based upon manufacturer's specification regarding the stability of the one or more gyroscopes. Typically, the manufacturer provides gyro drift rate data measured in degrees per hour. In certain embodiments, a short timeframe integration of gyroscope measurements is used to correct or adjust a continuously or periodically computed vehicle bank angle θ (e.g., by integration of gyroscopic measurements).

As part of calculating vehicle bank angle θ, a window/buffer of measurement samples may be used. For example, when a turn is detected in step 1100 as discussed above, the sample buffer may be used to store both pre-turn measurement samples and post-turn measurement samples. More specifically, when integrating gyroscope measurements from one or more gyroscopes to compute vehicle bank angle θ, these samples may be stored within one or more sample buffers in a memory. Pre-turn measurements may then be used to calibrate the gyroscope (e.g., to find a bias point). Measurement samples in the sample buffer used to calculate vehicle bank angle θ may be shared to accomplish other functions. For example, measurement samples may be shared by the turn detection filter discussed above.

Figure 2:
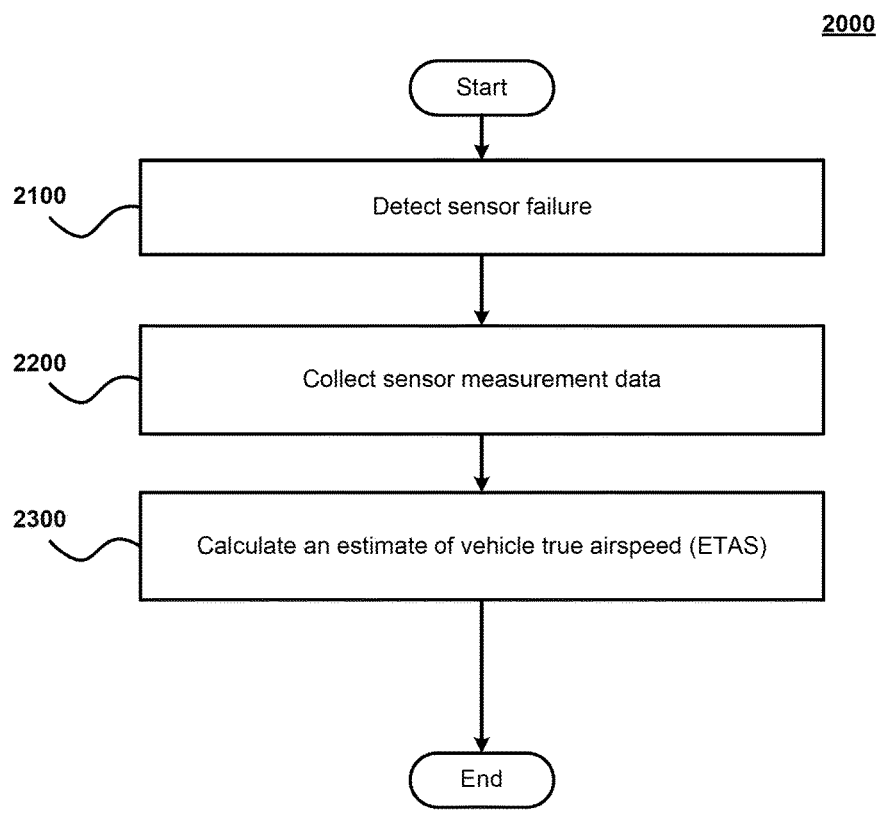
FIG. 2 is a flow diagram illustrating a process for obtaining an estimate of vehicle true airspeed (ETAS) in accordance with some embodiments of the present invention.

FIG. 2 is a process flow diagram that illustrates a method 2000 for obtaining an estimate of vehicle speed (ETAS), such as true airspeed, when a temperature probe has failed or is not present. In step 2100, the failure, inaccuracy, or absence of one or more temperature probes is detected. In step 2200, sensor measurement data from other sensors is collected. In certain embodiments, collection of such sensor data is triggered by the detection of the failure, inaccuracy or absence of the temperature sensor. In alternative embodiments, sensor data is collected without detecting the failure or absence of a temperature sensor. In certain embodiments, collected sensor data may include gyroscope, accelerometer, magnetometer, and/or (static/dynamic) pressure measurements. In step 2300, ETAS is calculated. In certain embodiments, ETAS may be calculated according to the following relationship:

$$ETAS = \frac{g\tan\theta}{TR \cdot K},$$

where θ is vehicle bank angle θ, TR is vehicle turn rate, K is a scaling factor and g is gravity. Vehicle bank angle θ may be calculated using the methods illustrated and described with respect to FIG. 1 or any other method. In certain embodiments, ETAS is continuously or periodically computed (e.g., without detecting a turn, during a turn, and/or without detecting a probe failure). Vehicle turn rate TR may be provided in any known method. In certain embodiments, vehicle turn rate TR may be computed using the measurements provided by one or more gyroscopic sensors. In certain embodiments, vehicle turn rate TR is estimated by filtering the output measurements of one or more sensors, which may include both pre- and post-turn measurement data. For example, vehicle turn rate TR may be calculated or estimated by low-pass filtering gyroscopic measurement data.

Figure 3:
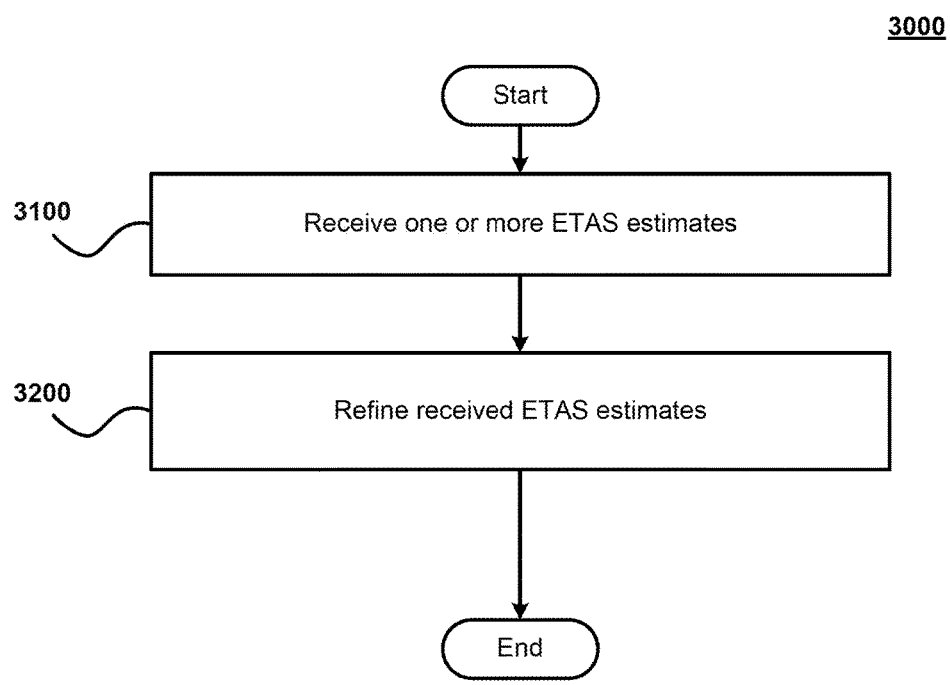
FIG. 3 is a flow diagram illustrating a process for refining an estimate of vehicle true airspeed (ETAS) in accordance with some embodiments of the present invention.

FIG. 3 is a process flow diagram that illustrates a method 3000 for refining ETAS estimates. In step 3100, one or more ETAS estimates is received. In certain embodiments, the ETAS may be estimated using sensor measurements. For example, ETAS may be computed using the relationship:

$$ETAS = 661.47\sqrt{\frac{5T}{288.15}\left[\left(\frac{q_c}{P}+1\right)^{\frac{2}{7}}-1\right]},$$

where ETAS is an estimate of vehicle true airspeed in knots, T is static air temperature in Kelvin, $q_c$ is dynamic pressure, and P is static pressure. In certain embodiments, the ETAS estimate is provided in accordance with the methods illustrated and described with respect to FIG. 2. In step 3200, one or more ETAS estimates received in step 3100 are refined into an improved estimate of ETAS. In certain embodiments, ETAS is refined though low-pass filtering two or more ETAS estimates. In certain embodiments, the cut-off frequency of the filter is lower than the expected gyro drift rate. In certain embodiments, the cut-off frequency of the filter is determined based upon a manufacturer's specification regarding the stability of the one or more gyroscopes, which is typically measured by the manufacturer in degrees per hour. In certain embodiments, during normal operation of all sensors, the parameters of one or more refining filters are determined by iteratively calculating true airspeed using received sensor values and the relationship:

$$TAS = 661.47\sqrt{\frac{5T}{288.15}\left[\left(\frac{q_c}{P}+1\right)^{\frac{2}{7}}-1\right]}$$

and computing one or more estimates of true airspeed using a technique that provides an estimate of true airspeed when a sensor measurement, such as a temperature sensor measurement, has been lost or absent. For example, such an estimate of true airspeed (ETAS) may be computed according to the methods illustrated and described with respect to FIG. 2. In certain embodiments, the difference or ratio between the different airspeed estimates are used to compute refining filter parameters.

Figure 4:
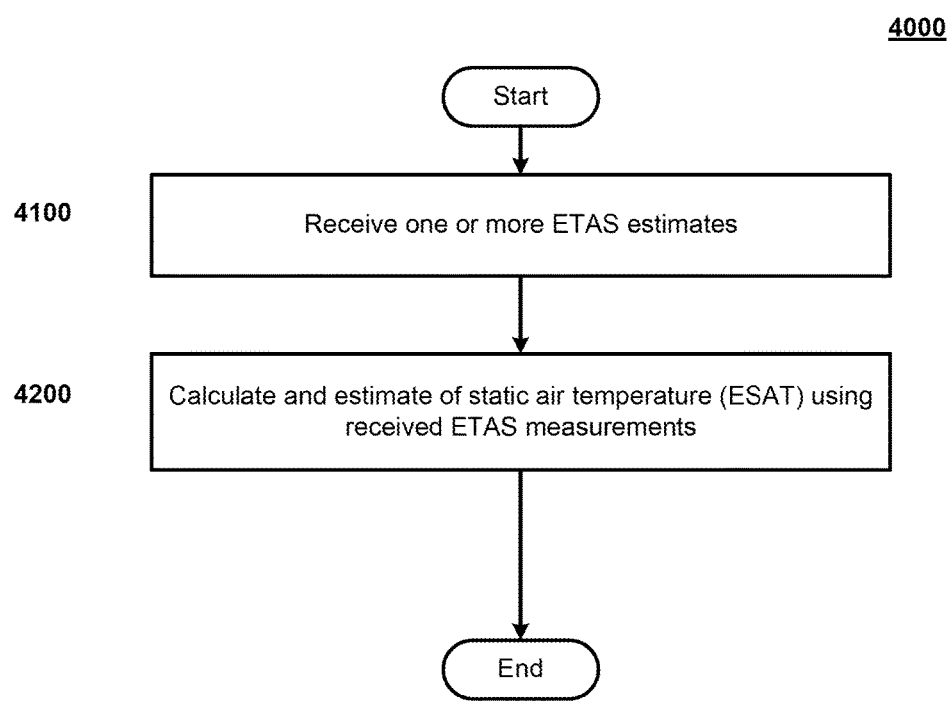
FIG. 4 is a flow diagram illustrating a process for obtaining an estimate of static air temperature (ESAT) using an estimate of vehicle true airspeed (ETAS) in accordance with some embodiments of the present invention.

FIG. 4 is a process flow diagram that illustrates a method 4000 for calculating an estimate of static air temperature (ESAT) using ETAS estimates. In step 4100, an ETAS estimate is received. In certain embodiments, the ETAS estimate is computed from one or more sensor measurements (e.g., temperature, pressure). In certain embodiments, the ETAS estimate is provided in accordance with the methods illustrated and described with respect to FIG. 2. In certain embodiments, the measurement of ETAS is a refined measurement. For example, the measurement of ETAS may be refined and provided in accordance with the methods illustrated and described with respect to FIG. 3. In step 4200, an estimate of static air temperature (ESAT) is calculated using the received ETAS measurement. In certain embodiments, ESAT is continuously or periodically computed (e.g., without detecting a turn, during a turn, and/or without detecting a probe failure). In certain embodiments, ESAT is calculated using the relationship:

$$ESAT = \frac{ETAS^2}{7592.270708\left[\left(\frac{q_c}{P}+1\right)^{\frac{2}{7}}-1\right]}.$$

Once computed, ESAT may be substituted for a temperature sensor measurement. For example, when a temperature sensor has failed, ESAT may be used to calculate an estimate of vehicle true airspeed, using the relationship:

$$ETAS = 661.47\sqrt{\frac{5(ESAT)}{288.15}\left[\left(\frac{q_c}{P}+1\right)^{\frac{2}{7}}-1\right]},$$

when a temperature sensor measurement reading for T is not available.

Figure 5:
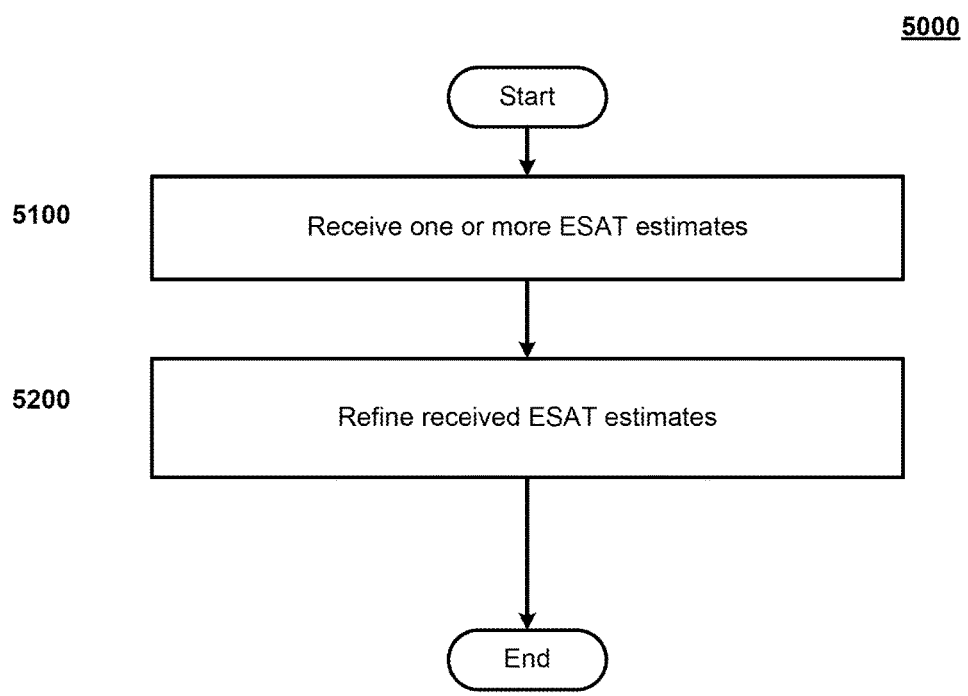
FIG. 5 is a flow diagram illustrating a process for refining an estimate of static air temperature (ESAT) in accordance with some embodiments of the present invention.

FIG. 5 is a process flow diagram that illustrates a method 5000 for refining ESAT estimates. In step 5100, one or more ESAT estimates is received. In certain embodiments, the ESAT estimate may be a measurement provided by an available temperature sensor (e.g., the current/last temperature sensor measurement). In certain embodiments, the ESAT estimate is provided in accordance with the methods described and illustrated with respect to FIG. 4. In step 5200, one or more ESAT estimates received in step 5100 are refined into an improved estimate of ESAT. In certain embodiments, ESAT is refined though low-pass filtering two or more received ESAT estimates. In certain embodiments, the cut-off frequency of the filter is lower than the expected gyro drift rate, as discussed above. In certain embodiments, during normal operation of one or more sensors, the parameters of one or more refining filters are determined by iteratively using one or more received sensor measurements and computing one or more estimates for a corresponding lost sensor measurement (which in this example is not actually lost or absent). For example, an estimate of a lost static air temperature measurement (ESAT) may be computed according to the methods illustrated and described with respect to FIG. 4. In certain embodiments, the difference or ratio between the actual and estimated sensor measurements are used to compute refining filter parameters. In certain embodiments, a Kalman filter may be used to refine the ESAT estimate. ESAT estimates used to update the Kalman filter may be pre-filtered before being supplied to the Kalman filter. For example, ESAT estimates may be low-pass filtered as previously discussed. During the period between receiving ESAT estimates (e.g., during the time between detected turns), the Kalman filter may be used to dead-reckon (forward project) the ESAT estimate according to a thermodynamic model.

Figure 6:
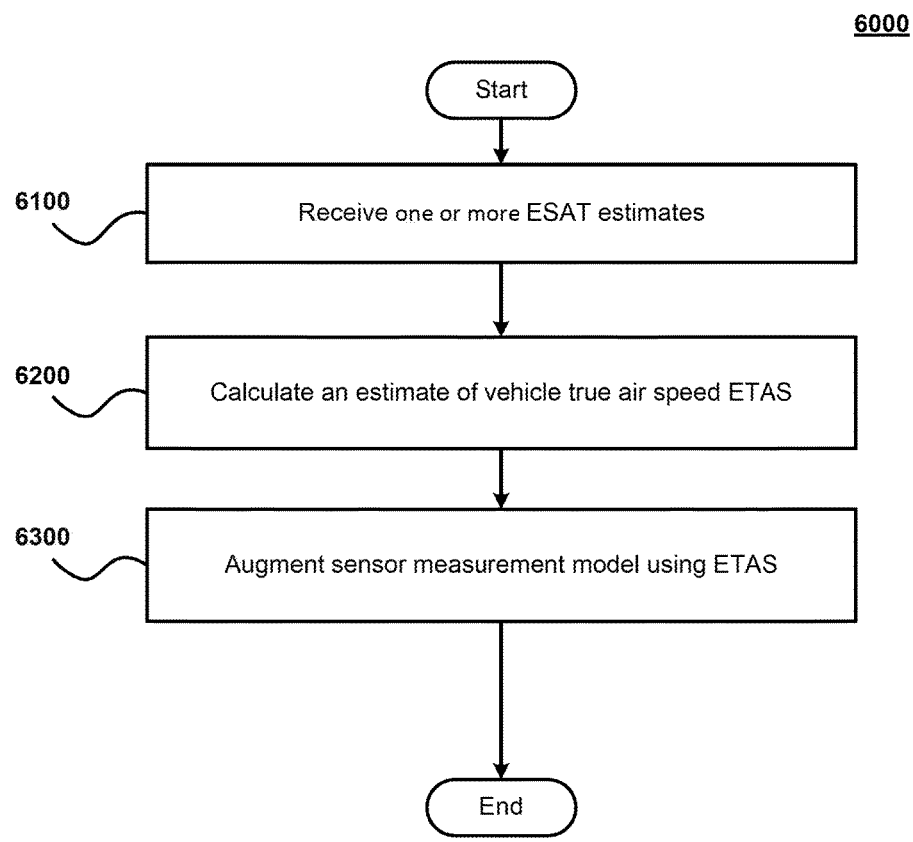
FIG. 6 is a flow diagram illustrating a process for obtaining an estimate of vehicle true airspeed (ETAS) using an estimate of static air temperature (ESAT) in accordance with some embodiments of the present invention.

FIG. 6 is a process flow diagram that illustrates a method 6000 for applying ESAT estimates to further estimate vehicle true air speed (ETAS). In step 6100, one or more ESAT estimates is received. The ESAT estimate may be provided in any known manner. In certain embodiments, the ESAT estimate is provided in accordance with the methods illustrated and described with respect to FIG. 4. In certain embodiments, the ESAT estimate is a refined estimate. For example, a refined ESAT estimate may be provided in accordance with the methods described and illustrated with respect to FIG. 5. In step 6200, an estimate of vehicle true air speed ETAS is calculated using one or more ESAT estimates provided in step 6100. In certain embodiments, ETAS is continuously or periodically computed (e.g., without detecting a turn, during a turn, and/or without detecting a probe failure). In certain embodiments, the estimate of vehicle true air speed ETAS is calculated using the relationship:

$$ETAS = 661.47\sqrt{\frac{5(ESAT)}{288.15}\left[\left(\frac{q_c}{P}+1\right)^{\frac{2}{7}}-1\right]},$$

where: ETAS is an estimate of true airspeed, ESAT is an estimate of static air temperature in Kelvin, $q_c$ is dynamic pressure, and P is static pressure. In step 6300, the estimate of vehicle true air speed ETAS may then be used to augment the sensor (e.g., accelerometer, magnetometer) measurement model. For example, the estimate of vehicle true air speed ETAS may be used in situations where true air speed cannot be computed directly because a temperature sensor or other sensor has failed to provide one or more measurements, is inaccurate, or is not otherwise present. This estimate of ETAS can then be further used to calculate an estimate of vehicle bank angle (Eθ).

Figure 7:
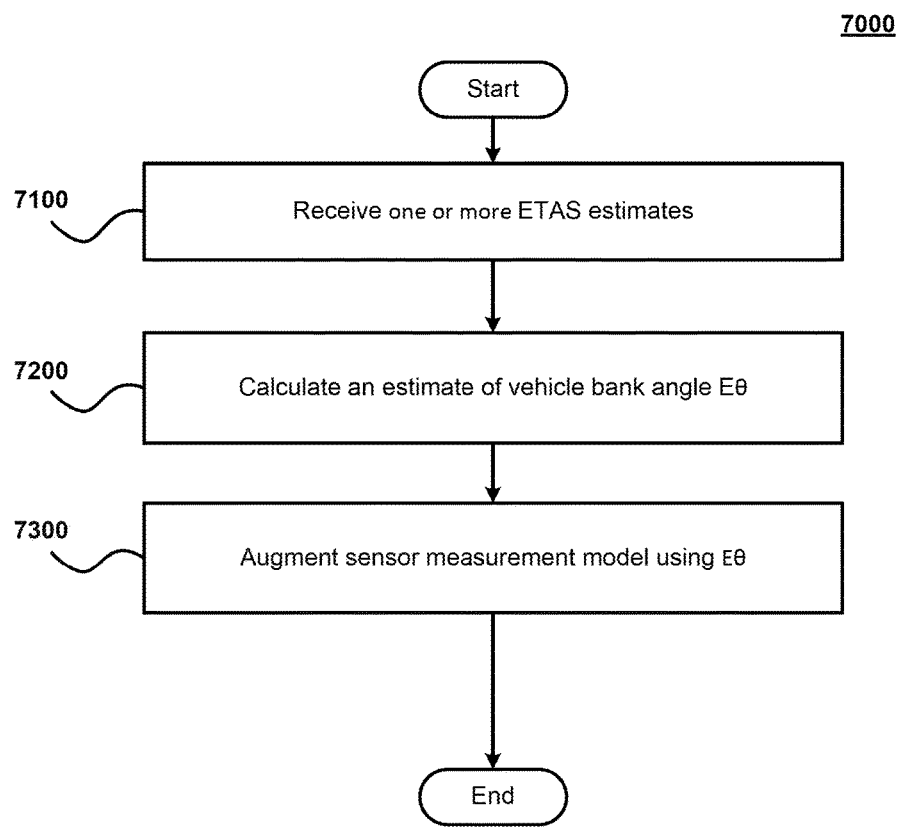
FIG. 7 is a flow diagram illustrating a process for obtaining an estimate of vehicle bank angle Eθ using an estimate of vehicle true airspeed (ETAS) in accordance with some embodiments of the present invention.

FIG. 7 is a process flow diagram that illustrates a method 7000 for applying ETAS estimates to further estimate vehicle bank angle (Eθ). In step 7100, one or more ETAS estimates is received. The ETAS estimate may be provided in any known manner. In certain embodiments, the ETAS estimate is provided in accordance with the methods illustrated and described with respect to FIGS. 2 and/or 6. In certain embodiments, the ETAS estimate is a refined estimate. For example, a refined ETAS estimate may be provided in accordance with the methods described and illustrated with respect to FIG. 3. In step 7200, an estimate of vehicle bank angle Eθ is calculated using one or more ETAS estimates provided in step 7100. In certain embodiments, Eθ is continuously or periodically computed (e.g., without detecting a turn, during a turn, and/or without detecting a probe failure). In certain embodiments, the estimate of vehicle bank angle Eθ is calculated using the relationship:

$$E\theta = \tan^{-1}\left(\frac{ETAS \cdot TR \cdot K}{g}\right),$$

where: Eθ is an estimate vehicle bank angle, ETAS is an estimate of true airspeed, TR is turn rate, K is a scaling factor and g is gravity. In step 7300, the estimate of vehicle bank angle Eθ may then be used to augment the sensor (e.g., accelerometer, magnetometer) measurement model. For example, the estimate of vehicle bank angle Eθ may be used in situations where vehicle bank angle θ cannot be computed directly because a temperature sensor or other sensor has failed to provide one or more measurements, is inaccurate, or is not otherwise present.

In certain embodiments, an initial ETAS estimate is computed by detecting a turn and then computing the vehicle bank angle θ using a short-time frame computation. For example, as illustrated and discussed above with respect to FIG. 1, gyroscopic measurements received from one or more gyroscopes over an acceptably short time frame may be integrated to determine an initial bank angle θ. In certain embodiments, the short timeframe is determined based upon a manufacturer's specification regarding the stability of the one or more gyroscopes, which is typically measured by the manufacturer in degrees per hour. Once an initial vehicle bank angle θ is computed, an initial ETAS estimate is computed. For example, an ETAS estimate may be calculated as illustrated and discussed above with respect to FIG. 2 or 6. Once the initial ETAS estimate is computed for the detected turn, it may also be refined. For example, ETAS estimates may be refined as illustrated and discussed above with respect to FIG. 3. Following any refinement of the ETAS estimate, an ETAS estimate or a refined ETAS estimate may then be used to calculate an estimate of vehicle bank angle Eθ or an estimate of a lost temperature sensor measurement (static air temperature/ESAT), as discussed above. In certain embodiments, an ETAS estimate or a refined ETAS estimate may be used for estimating wind speed and direction. For example, wind speed may be computed as using the difference between an ETAS estimate and ground speed (as measured by GPS or inertial measurement unit) in conjunction with heading and course measurements.

Figure 8:
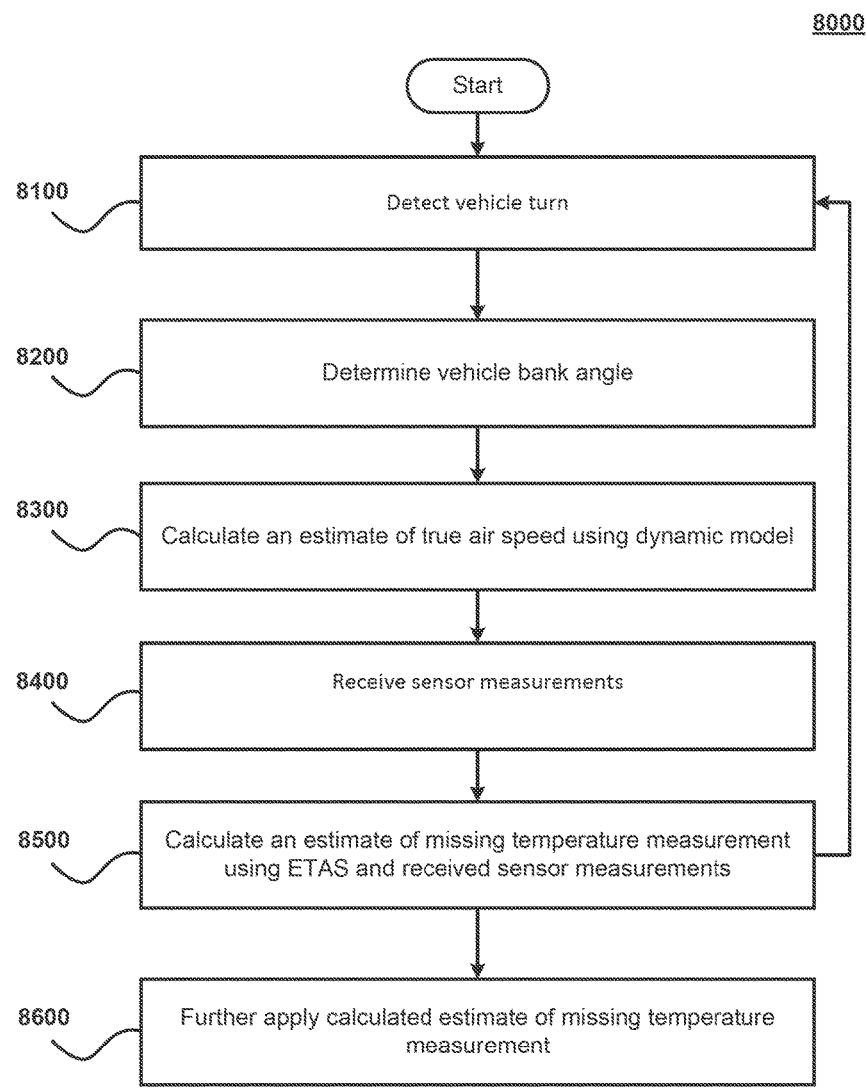
FIG. 8 is a flow diagram illustrating a process for obtaining an absent temperature sensor measurement in accordance with some embodiments of the present invention.

FIG. 8 is process flow diagram that illustrates a method 8000 for computing an estimate of an absent temperature sensor measurement. In step 8100, a vehicle turn is detected. For example, a vehicle turn may be detected as illustrated and discussed above with respect to FIG. 1. In step 8200, a vehicle bank angle is determined. For example, vehicle bank angle may be determined as illustrated and discussed above with respect to FIG. 1 or 7. In step 8300, an estimate of true air speed (ETAS) is calculated. For example, ETAS may be calculated as illustrated and discussed above with respect to FIG. 2 or 6. In certain embodiments, ETAS may be further refined as illustrated and discussed above with respect to FIG. 3. In step 8400, one or more sensor measurements are received. These sensor measurements may include static pressure and/or dynamic pressure measurements. In step 8500, an estimate for a missing temperature sensor measurement (ESAT) may be computed using the relationship:

$$ESAT = \frac{ETAS^2}{7592.270708\left[\left(\frac{q_c}{P}+1\right)^{\frac{2}{7}}-1\right]}.$$

In certain embodiments, ESAT is calculated as illustrated and discussed above with respect to FIG. 4. In certain embodiments, the estimate of the missing temperature sensor measurement is further refined. For example, ESAT may be refined in accordance with the methods illustrated and discussed above with respect to FIG. 5. In step 8600, the estimate of the missing temperature sensor measurement may be employed in further applications. For example, the estimate of the missing sensor measurement (ESAT) may be used to further calculate vehicle air speed using the relationship:

$$ETAS = 661.47\sqrt{\frac{5(ESAT)}{288.15}\left[\left(\frac{q_c}{P}+1\right)^{\frac{2}{7}}-1\right]}.$$

In turn, this ETAS measurement may be used to calculate vehicle bank angle as illustrated and discussed above with respect to FIG. 7. In another example, an estimate of static air temperature (ESAT) may be substituted for T in calculating a vehicle bank angle. As another example, ESAT may also be used to correct the temperature estimate given by a standard model (e.g., ISA model) as further discussed with respect to FIGS. 10-12 below.

Although the methods described herein have been primarily directed to compensating for the loss of a temperature sensor measurement, the described methods are equally applicable when other types of sensors have similarly failed or to compensate for other sensor measurement absences. For example, if static pressure or dynamic pressure probes/sensors have failed, estimates of speed (e.g., ETAS) may still be calculated as illustrated and discussed above. In addition, once an estimate of speed (e.g., ETAS) is calculated, it is possible to compute an estimate for the measurement of the missing sensor (e.g., temperature, dynamic pressure or static pressure) using the relationship:

$$SAT = \frac{ETAS^2}{7592.270708\left[\left(\frac{q_c}{P}+1\right)^{\frac{2}{7}}-1\right]},$$

and solving the equation for the corresponding missing variable (e.g., SAT, $q_c$, P). Thus, it should be apparent to one of ordinary skill in the art that the estimate of static air temperature ESAT discussed above, which was calculated in the absence or failure of a temperature sensor, would be replaced with an estimate of static pressure (EP) when a static pressure sensor is or becomes unavailable and/or an estimate of dynamic air pressure ($Eq_c$) when a dynamic pressure sensor is or becomes unavailable. In certain embodiments, where both static and dynamic pressure sensors have failed, instead of treating $q_c$ and P as two separate values, these two measurements may be treated as a single value using an estimate of the ratio of the pressure sensor measurements $E(q_c/P)$, which may be solved for and determined using the above relationship.

Figure 9:
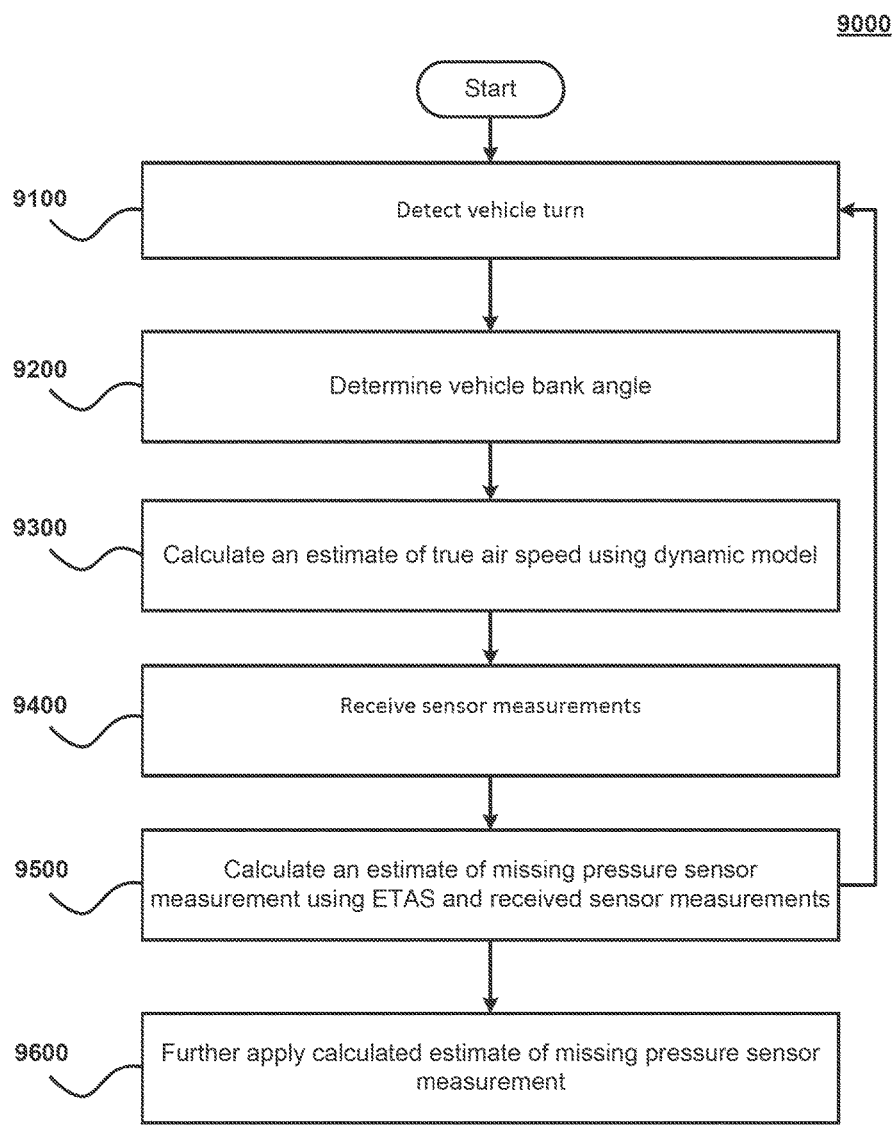
FIG. 9 is a flow diagram illustrating a process for obtaining absent pressure sensor measurements in accordance with some embodiments of the present invention.

FIG. 9 is process flow diagram that illustrates a method 9000 for computing an estimate of an absent pressure sensor measurement. In step 9100, a vehicle turn is detected. For example, a vehicle turn may be detected as illustrated and discussed above with respect to FIG. 1. In step 9200, a vehicle bank angle is determined. For example, vehicle bank angle may be determined as illustrated and discussed above with respect to FIG. 1 or 7. In step 9300, an estimate of true air speed (ETAS) is calculated. For example, ETAS may be calculated as illustrated and discussed above with respect to FIG. 2 or 6. In certain embodiments, ETAS may be further refined as discussed with respect to FIG. 3. In step 9400, one or more sensor measurements are received. These sensor measurements may include temperature, static pressure, and/or dynamic pressure measurements. In step 9500, an estimate for a missing pressure sensor measurement is computed. For instance, when a static pressure sensor measurement is missing, an estimate of static pressure (EP) may be computed using the relationship:

$$EP = qc \Big/ \left[\left(\frac{ETAS^2}{7592.270708\,T}+1\right)^{\frac{7}{2}}-1\right].$$

As another example, when a dynamic pressure sensor measurement is missing, an estimate of dynamic pressure ($Eq_c$) may be computed using the relationship:

$$Eqc = P*\left[\left(\frac{ETAS^2}{7592.270708\,T}+1\right)^{\frac{7}{2}}-1\right].$$

As a further example, when both static and dynamic pressure sensor measurements are missing, an estimate of the ratio of dynamic pressure to static pressure ($E\,q_c/P$) may be computed using the relationship:

$$E\left(\frac{qc}{p}\right) = \left(\frac{ETAS^2}{7592.270708\,T}+1\right)^{\frac{7}{2}}-1.$$

In certain embodiments, the estimate of the missing sensor measurement is further refined. For example, the estimate of the missing pressure sensor measurement may be refined in accordance with the methods illustrated and discussed above with respect to FIG. 5. In step 9600, the estimate of the missing pressure sensor measurement may be employed in further applications. For example, the estimate of the missing static pressure sensor measurement may be used to further calculate vehicle air speed using the relationship:

$$ETAS = 661.47\sqrt{\frac{5(T)}{288.15}\left[\left(\frac{q_c}{EP}+1\right)^{\frac{2}{7}}-1\right]}.$$

As another example, the estimate of the missing dynamic pressure sensor measurement may be used to further calculate vehicle air speed using the relationship:

$$ETAS = 661.47\sqrt{\frac{5(T)}{288.15}\left[\left(\frac{Eq_c}{P}+1\right)^{\frac{2}{7}}-1\right]}.$$

As a further example, an estimate of the ratio of dynamic pressure to static pressure sensor measurements E ($q_c/P$) may be used to further calculate vehicle air speed using the relationship:

$$ETAS = 661.47\sqrt{\frac{5(T)}{288.15}\left[\left(E\left(\frac{q_c}{P}\right)+1\right)^{\frac{2}{7}}-1\right]}.$$

In turn, this ETAS measurement may be used to calculate vehicle bank angle as illustrated and discussed above with respect to FIG. 7.

Figure 10:
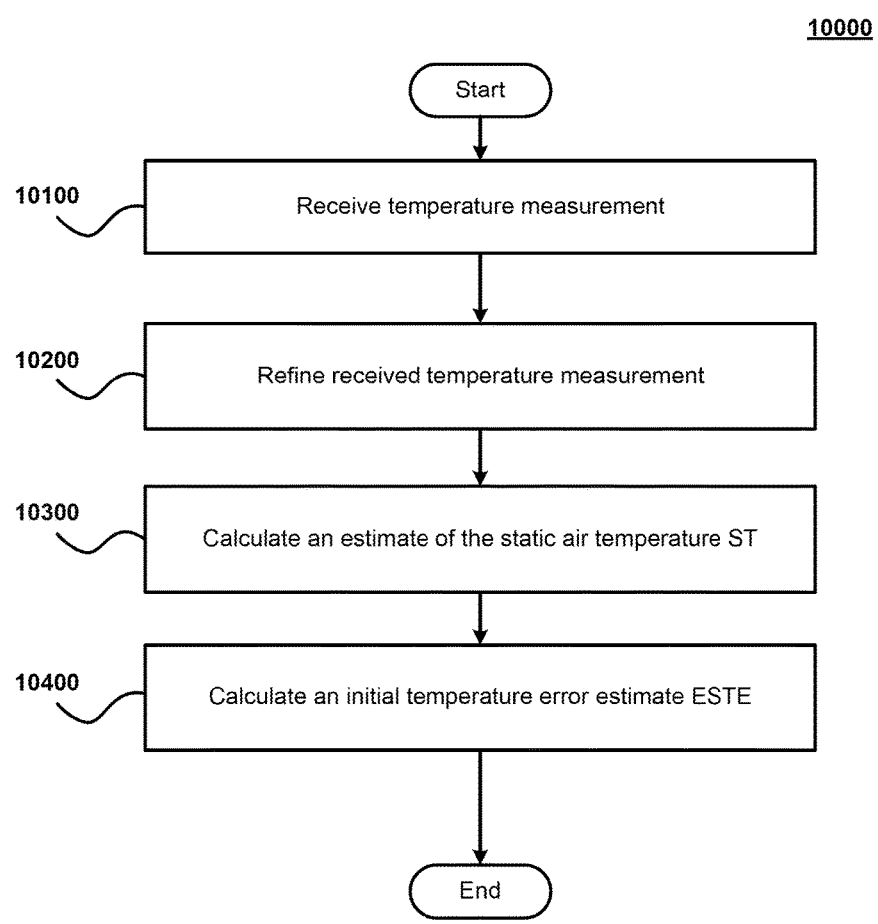
FIG. 10 is a flow diagram illustrating a process for obtaining an improved temperature error estimate based on a standard model in accordance with some embodiments of the present invention.

FIG. 10 is a process flow diagram that illustrates a method 10000 for computing an improved temperature estimate based on a standard model (e.g., an ISA model). In step 10100, one or more temperature measurements are received from a temperature sensor (e.g., the current/last temperature sensor measurement). In step 10200, the one or more received temperature measurements may be refined. For example, the one or more received temperature measurements may be refined by low-pass filtering the measurements. In step 10300, an estimate of the static air temperature ST is computed. For example, an estimate of the static air temperature ST may be computed using a standard model. In certain embodiments, the standard model provides a temperature in a manner independent of a dynamic model. For example, the ISA model may be used as a standard model to supply temperatures. In step 10400, an initial temperature error estimate ESTE is computed. For example, ESTE may be calculated as the difference between the temperature ST computed using the standard model and the last received temperature measurement, which may be a refined temperature measurement.

Figure 11:
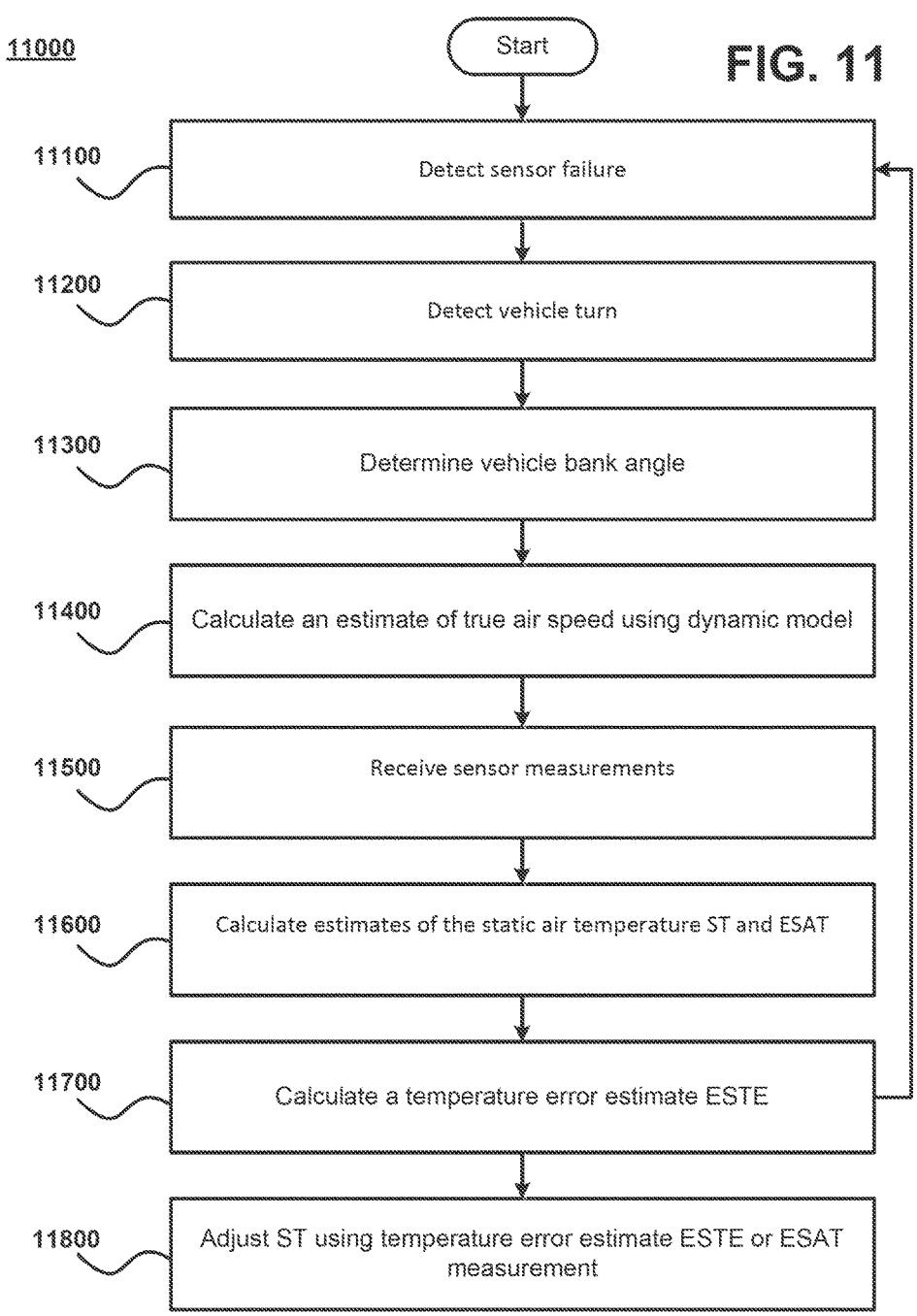
FIG. 11 is a flow diagram illustrating a process for computing an improved temperature estimate based on a standard model in accordance with some embodiments of the present invention.

FIG. 11 is a process flow diagram that illustrates a method 11000 for computing an improved temperature estimate based on a standard model (e.g., an ISA model). In step 11100, the failure, inaccuracy, or absence of one or more temperature probes is detected. In step 11200, a vehicle turn is detected. For example, a vehicle turn may be detected as illustrated and discussed above with respect to FIG. 1. In step 11300, a vehicle bank angle is determined. For example, vehicle bank angle may be determined as illustrated and discussed above with respect to FIG. 1 or 7. In step 11400 an estimate of true air speed (ETAS) is calculated. For example, ETAS may be calculated as illustrated and discussed above with respect to FIG. 2 or 6. In certain embodiments, ETAS may be further refined as illustrated and discussed above with respect to FIG. 3. In step 11500, one or more sensor measurements are received. These sensor measurements may include static pressure and/or dynamic pressure measurements. In step 11600, a plurality of estimates of the static air temperature ST is computed. For example, a first estimate of the static air temperature (ST) may be computed using a standard model. In certain embodiments, the standard model provides a temperature in a manner independent of a dynamic model. For example, the ISA model may be used as a standard model to supply temperatures. In addition, a second estimate of the static air temperature may be computed according to the dynamic model using the received ETAS measurements and the relationship:

$$ESAT = \frac{ETAS^2}{7592.270708\left[\left(\frac{q_c}{P}+1\right)^{\frac{2}{7}}-1\right]},$$

where ETAS is an estimate of true airspeed, $q_c$ is dynamic pressure, and P is static pressure. In certain embodiments, a refined ETAS estimate is used. For example, ETAS may refined as illustrated and discussed above with respect to FIG. 3. In step 11700, a temperature error estimate ESTE is computed. For example, ESTE may computed using the equation: ESTE=ST−ESAT. In certain embodiments, ESAT is a refined estimate. For example, ESAT may be refined in accordance with the methods illustrated and discussed above with respect to FIG. 5. In step 11800, a temperature estimate provided by a standard model is updated using an estimate derived from the dynamic model. For example, for successive calculations, the temperature ST provided by a standard model, such as the ISA model, may be adjusted by adding to it the temperature error estimate ESTE, which was computed using the dynamic model. In other embodiments, the temperature ST provided by a standard model may be adjusted by summing together a weighted ST (e.g., ISA model temperature) estimate and a weighted ESAT estimate. Generally, the weights will sum to one. In certain embodiments, the weights assigned to each estimate (e.g., $ST_{weight}$, $ESAT_{weight}$) may be statically assigned. For example, each estimate may be weighted equally (0.5). In certain embodiments, the weights are assigned dynamically. For example, near in time to a detected turn, the weight afforded to the ESAT estimate may be higher (e.g., 0.75-1.0). Over time, the weight afforded the ESAT estimate may decay to zero or some other lesser value (e.g., 0.0-0.75). For example, the amount of decay may be based upon the time between updates to the ESAT estimate (e.g., the time between detected turns). The amount of decay may also be based upon a change in the vehicle's position (e.g., altitude, latitude, longitude, or total distance travelled). In certain embodiments, time-based and position-based decay are combined. The decay rate may be exponential, linear, or any other suitable decay rate. In certain embodiments, the weight assigned to the ST estimate provided by the standard model may be computed as $(1-ESAT_{weight})$. Similarly, the ST weight may be assigned a weight which decays over time. In this case, the weight assigned to the ESAT estimate may then be computed as $(1-ST_{weight})$. Negative decay rates (e.g., growth rates) for the weights are also possible. In certain embodiments, the weight values (e.g., $ST_{weight}$, $ESAT_{weight}$) may be based upon estimates or confidence levels provided by a Kalman filter.

Figure 12:
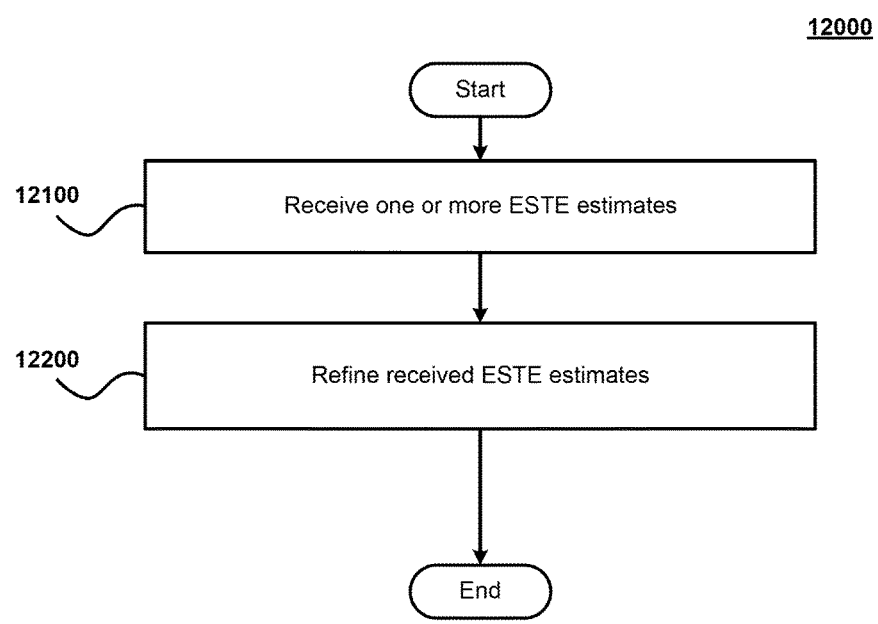
FIG. 12 is a flow diagram illustrating a process for refining a temperature error estimate (ESTE) in accordance with some embodiments of the present invention.

FIG. 12 is a process flow diagram that illustrates a method 12000 for refining ESTE estimates. In step 12100, one or more ESTE estimates is received. In certain embodiments, the ESTE estimate is an initial estimate of ESTE provided in accordance with the methods described and illustrated with respect to FIG. 10. In certain embodiments, the ESTE estimate is an estimate of ESTE provided in accordance with the methods described and illustrated with respect to FIG. 11. In step 12200, a one or more ESTE estimates received in step 12100 are refined into an improved estimate of ESTE. In certain embodiments, ESTE is refined though low-pass filtering two or more received ESTE estimates. In certain embodiments, the cut-off frequency of the filter is lower than the expected gyro drift rate. In certain embodiments, a Kalman filter may be used to refine the estimate of ESTE. Received ESTE estimates used to update the Kalman filter may be pre-filtered before being supplied to the Kalman filter. For example, the ESTE estimate may be low-pass filtered as previously discussed. During the period between receiving ESTE estimates, the Kalman filter may be used to dead-reckon the ESTE estimate according to a thermodynamic model. In certain embodiments, ESTE is refined by decaying the ESTE estimate to zero. For example, the amount of decay may be based upon the time between updates to the ESTE estimate (e.g., the time between detected turns). The amount of decay may also be based upon a change in the vehicle's position (e.g., altitude, latitude, longitude, or total distance travelled). In certain embodiments, time-based and position-based decay are combined. The decay rate may be exponential, linear, or any other suitable decay rate. Negative decay rates (e.g., growth rates) are also possible.

Figure 13:
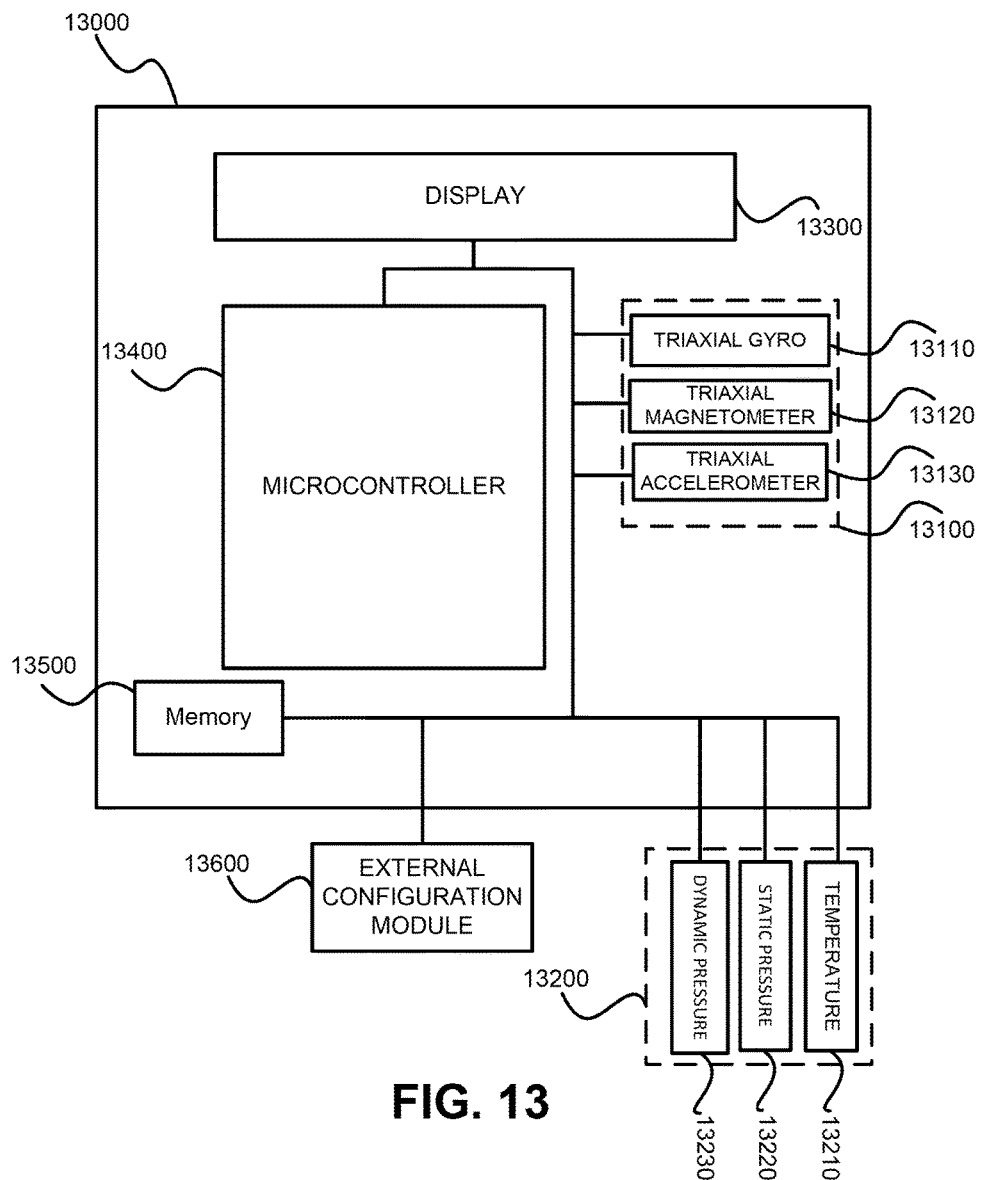
FIG. 13 is a block diagram of a system in accordance with some embodiments of the present invention.

FIG. 13 is a block diagram illustrating an exemplary heading reference system 13000 in accordance with some embodiments of the disclosed subject matter. The heading reference system 13000 may be incorporated into an aircraft, maritime vessel, or other vehicle. System 13000 may be an AHRS, ADAHRS, or Integrated Standby. The heading reference system 13000 may be configured to perform the methods disclosed in FIGS. 1-12 either independently or in conjunction with other components of the vehicle that includes the heading reference system 13000.

As shown in FIG. 13, heading reference system 13000 includes an inertial measurement unit 13100, which includes triads of gyroscopes 13110, magnetometers 13120, and accelerometers 13130. Heading reference system 13000 may also include additional environmental sensors, including: temperature probes 13210, static pressure probes 13220, and dynamic pressure probes 13230. In certain embodiments, environmental sensors may be included in an environmental sensor unit 13200. The methods disclosed above may be utilized in conjunction with both inertial sensors and environmental sensors, including: gyroscopes 13110, magnetometers 13120, accelerometers 13130, temperature probes 13210, static pressure probes 13220, and dynamic pressure probes 13230.

As illustrated, heading reference system 13000 may also include a display 13300. The display 13300 may include one or more liquid crystal displays (LCDs), light emitting diodes (LEDs), organic light emitting diodes (OLEDs), and/or any other suitable display components.

Additionally, heading reference system 13000 may include a processor 13400 and memory 13500 that receive and store external inputs from a configuration module 13600

(e.g., which may include the theoretical values and properties mentioned above and/or manual entries of additional parameters such as known and/or previously calibrated values) as well as inputs from any and/or all of the components of inertial measurement unit 13100 or the sensors themselves directly (e.g., magnetometer, accelerometer, and/or gyroscope measurements, which may be in the form of A/D converter samples) as well as inputs from any and/or all of the components of environmental sensor unit 13200 or the environmental sensors themselves directly (e.g., temperature, static pressure, and/or dynamic pressure measurements, which may be in the form of A/D converter samples). In certain embodiments, system 13000 may include a global positioning system (GPS) or other navigation sensors to provide additional navigation information (e.g., course of vehicle).

In certain embodiments, system 13000 may further include one or more non-transitory, physical storage devices (not shown) that can store any and all data associated with the heading system 13000 including, but not limited to, any data associated with the internal and external inputs. The storage device may further store computer program instructions associated with any or all of the above activities that involve adjusting the heading system (or associated components) including any activities discussed above with reference to FIGS. 1-12. Processor 13400 may communicate with the storage device to access any of the stored data and/or to execute any of the stored instructions.

While there have been shown and described various novel features of the invention as applied to particular embodiments thereof, it should be understood that various omissions and substitutions and changes in the form and details of the systems and methods described and illustrated, may be made by those skilled in the art without departing from the spirit of the invention. Those skilled in the art will recognize, based on the above disclosure and an understanding therefrom of the teachings of the invention, that the general structure and functionality provided by and incorporated therein, may vary in different embodiments of the invention. Accordingly, the particular systems and methods shown in FIGS. 1-13 are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation, and the present invention is limited only by the claims which follow.

What is claimed is:

1. A method for compensating for a loss of a temperature sensor measurement in an attitude and heading reference system on a vehicle, the method comprising:
   detecting a temperature sensor measurement loss from at least one temperature sensor mounted on the vehicle, wherein the temperature measurement is otherwise used to calculate the vehicle's true airspeed;
   detecting a turn by the vehicle;
   in response to detecting the turn, calculating a first vehicle bank angle using at least one gyroscope mounted on the vehicle;
   estimating the vehicle's true air speed using the first vehicle bank angle and the at least one gyroscope mounted on the vehicle;
   estimating a value for the lost temperature measurement for the at least one temperature sensor mounted on the vehicle using the vehicle's estimated true airspeed and at least one pressure sensor mounted on the vehicle;
   estimating a second vehicle bank angle using the estimate of the lost temperature measurement and the at least one gyroscope mounted on the vehicle; and
   compensating for a gyro-bias drift rate, where in compensating for the gyro-drift rate includes augmenting a sensor measurement model using the estimated second bank angle in an absence of a measurement from the at least one temperature sensor mounted on the vehicle.

2. A system for compensating for a loss of a sensor measurement in an attitude and heading reference system on a vehicle, the system comprising:
   a memory;
   at least one of a temperature sensor mounted on the vehicle, a static pressure sensor mounted on the vehicle, and a dynamic pressure sensor mounted on the vehicle, coupled to the memory;
   a processor coupled to the at least one sensor and memory, the processor being configured to:
     detect a sensor measurement loss for the at least one sensor mounted on the vehicle, wherein the sensor measurement is otherwise used to calculate the vehicle's true airspeed;
     detect a turn by the vehicle;
     in response to detecting the turn, calculate a first vehicle bank angle using at least one gyroscope mounted on the vehicle;
     estimate the vehicle's true air speed using the first vehicle bank angle and the at least one gyroscope mounted on the vehicle;
     estimate a value for the lost sensor measurement using the vehicle's estimated true airspeed and at least one of a properly operating pressure sensor or a properly operating temperature sensor mounted on the vehicle;
     estimate a second vehicle bank angle using the vehicle's estimated true airspeed and the at least one gyroscope mounted on the vehicle or the estimate of the lost sensor measurement for the at least one sensor mounted on the vehicle; and
     compensate for a gyro-bias drift rate, wherein compensating for the gyro-drift rate includes augmenting a sensor measurement model using the estimated second bank angle in an absence of a measurement from the at least one sensor mounted on the vehicle.

3. A method for compensating for an absence of a sensor measurement in a heading reference system on a vehicle, wherein the sensor measurement is otherwise used to calculate the vehicle's speed, the method comprising:
   detecting a sensor measurement loss for at least one sensor mounted on the vehicle, wherein a sensor measurement from the at least one sensor is otherwise used to calculate the vehicle's speed;
   detecting a turn by the vehicle;
   in response to detecting the turn, calculating a first vehicle bank angle using at least one gyroscope mounted on the vehicle;
   estimating the vehicle's speed using the first vehicle bank angle and the at least one gyroscope mounted on the vehicle; and
   estimating a value for the sensor measurement using the vehicle's estimated speed and at least one of a properly operating pressure sensor or a properly operating temperature sensor mounted on the vehicle; and
   compensating for the sensor measurement loss using the estimated value for the sensor measurement which is derived, at least in part, using the properly operating pressure sensor or the properly operating temperature sensor.

4. The method of claim 3, wherein the sensor measurement is one of temperature, static pressure, or dynamic pressure.

5. The method of claim 3, wherein the sensor measurement is a ratio of dynamic pressure to static pressure.

6. The method of claim 3, wherein the first vehicle bank angle is calculated using a short timeframe integration of gyroscopic measurements that accounts for a bias-drift of gyroscopic measurements.

7. The method of claim 3, wherein the vehicle's estimated speed is refined prior to estimating the value for the sensor measurement.

8. The method of claim 7, wherein the vehicle's estimated speed is refined using a low-pass filter with a cut off frequency lower than a gyro-bias drift rate.

9. The method of claim 7, wherein the vehicle's estimated speed is refined using a Kalman filter.

10. The method of claim 3, wherein the estimate for the sensor measurement is refined using a low-pass filter with a cut off frequency lower than a gyro-bias drift rate.

11. The method of claim 3, wherein the estimate for the sensor measurement is refined using a Kalman filter.

12. The method of claim 3, further comprising:
estimating a second vehicle bank angle using the vehicle's estimated speed or the estimate of the sensor measurement value; and
augmenting a sensor measurement model to compensate for a gyro-bias drift rate using the estimated second bank angle.

13. A method for compensating for a loss of a temperature sensor measurement in an attitude and heading reference system on a vehicle, the method comprising:
detecting a temperature sensor measurement loss from at least one temperature sensor mounted on the vehicle, wherein the temperature measurement is otherwise used to calculate the vehicle's true airspeed;
detecting a turn by the vehicle;
in response to detecting the turn, calculating a first vehicle bank angle using at least one gyroscope mounted on the vehicle;
estimating a first static air temperature using the first vehicle bank angle and at least one pressure sensor mounted on the vehicle;
estimating a second static air temperature independently of the first vehicle bank angle;
computing an adjusted static air temperature using the first and second static air temperatures; and
compensating for a gyro-bias drift rate, wherein compensating for the gyro-drift rate includes augmenting a sensor measurement model using the adjusted static air temperature in an absence of a measurement from the at least one temperature sensor mounted on the vehicle.

14. The method of claim 13, wherein computing the adjusted static air temperature further comprises:
calculating a temperature error estimate between the first and second static air temperatures; and
adding the temperature error estimate to a subsequently computed static air temperature to compute the adjusted static air temperature.

15. The method of claim 14, wherein the second and subsequently computed static air temperatures are calculated using a standard model.

16. The method of claim 14, wherein the temperature error estimate is decayed based upon a passage of time or change in the vehicle's position.

17. The method of claim 14, wherein the temperature error estimate is refined using a low-pass filter with a cut off frequency lower than the gyro-bias drift rate.

18. The method of claim 14, wherein the temperature error estimate is refined using a Kalman filter.

19. The method of claim 13, wherein computing the adjusted static air temperature further comprises:
weighting the first static air temperature using a first weight value;
weighting the second static air temperature using a second weight value; and
adding the weighted first and weighted second static air temperatures to compute the adjusted static air temperature.

20. The method of claim 19, wherein either the first or second weight value is decayed based upon a passage of time or a change in the vehicle's position.

* * * * *